United States Patent Office 3,598,753
Patented Aug. 10, 1971

---

3,598,753
ZINC SULFIDE PHOTOLUMINESCENT COMPOSITION
Stanley M. Poss, Towanda, Pa., assignor to Sylvania Electric Products Inc.
No Drawing. Filed May 7, 1969, Ser. No. 822,740
Int. Cl. C09k 1/12
U.S. Cl. 252—301.6S                            4 Claims

ABSTRACT OF THE DISCLOSURE

A photoluminescent phosphor that emits yellow light consisting essentially of a predominate portion zinc sulfide as the host and as an activator the following ingredients in percent by weight of the zinc sulfide: from about 0.001% to about 0.05% of copper, from about 0.003% to about 0.11% by weight of manganese and from about 0.66% to about 2.6% of zinc.

BACKGROUND OF THE INVENTION

This invention relates to photoluminescent phosphor compositions. More particularly it relates to photoluminescent phosphor compositions that emit light having a yellow color and have zinc sulfide as a host material and a tri-element activator.

In some photoluminescent phosphors it is desirable to have a phosphor that will emit light at a relatively high level of brightness for an appreciable period of time after the excitation media is removed from the phosphor. Typical uses, where extended persistence is desirable, are those in which the phosphor is applied to a substrate in form of a coating composition. An additional method of producing articles that are photoluminescent is by incorporating the phosphor composition into materials such as plastics, resins and the like prior to the time they are formed into articles. The yellow photoluminescent phosphors heretofore known had several disadvantages. For example, some exhibited poor persistence or decay, thus when the excitation source was removed the intensity of emission decreased very rapidly. Others that have relatively good persistance characteristics do not emit light having a satisfactory yellow color. In some of the phosphor compositions heretofore known, it would be desirable for the light emitted to be more intense when subjected to some excitation media such as normal daylight. It is believed, therefore, that a photoluminescent phosphor composition that emits a good yellow color having proper ICI color co-ordinates, increased persistence and emits relatively intense light when subjected to normal sources of light excitation, would be an advancement in the art.

SUMMARY OF THE INVENTION

In accordance with one aspect of this invention, there is provided a photoluminescent phosphor composition consisting essentially of zinc sulfide as the host and as an activator from about 0.001% to about 0.05% by weight of copper, from about 0.003% to about 0.11% by weight of manganese and from about 0.66% to about 2.6% by weight of zinc. The percentages of the foregoing metals are based upon the weight of the zinc sulfide. The above phosphor composition has improved phosphorescence throughout the period of from one minute to one hour after excitation when compared with copper-activated zinc sulfide, one of the previously known photoluminescent phosphors.

For a better understanding of the present invention, together with other and further objects, advantages and capabilities thereof, reference is made to the following disclosure and appended claims in connection with the above description of some of the aspects of the invention.

DESCRIPTION OF THE PREFERRED EMBODIMENTS

The photoluminescent phosphor compositions of the present invention are of the zinc sulfide type and have some properties similar to the previous known zinc sulfide phosphors that are activated generally by a single or a co-activator. In the compositions of this invention, a three-component activator is used within the amounts heretofore given. The three components of the activators are incorporated into the zinc sulfide host by employing thermosensitive metal compounds of copper, manganese and zinc. By thermosensitive compounds it is meant that the metal compounds will decompose at temperatures of below about 1000° C. to release the anion portion of the compounds. In many instances at least some of the metal portion can combine with other non-volatile anions present to form other metal compounds. As defined herein, the amounts of copper, manganese and zinc are calculated on the basis of the metal rather than on the basis of any particular compound.

One suitable method for producing the photoluminescent phosphor compositions of the present invention is to intimately admix the thermosensitive metal compounds of copper, manganese and zinc with the zinc sulfide in the amounts desired, then heat the mixture under non-oxidizing conditions and sufficient to impart a temperature of 1000–1300° C. to the mixture for about 1 to about 3 hours. Any metal compound that contains copper, manganese or zinc as the cation and that will decompose at temperatures of from about 100° C. to about 1000° C. in a non-oxidizing atmosphere to volatilize the anion portion of the metal compound. Typical suitable metal compounds include the metal oxides, nitrates, carbonates, acetates, oxalates and the like.

In general, the amount of metal compound employed in the mixture prior to heating will be about the same as that desired in the final product calculated on the basis of the metal. Slight losses of metal can in some instances occur, but these amounts are generally undetectable with standard analytical methods. Therefore, copper compounds will be employed in amounts of from about 0.001% to about 0.05% by weight based upon the weight of the zinc sulfide. It is preferred to utilize from about 0.009% to about 0.03% by weight of copper to attain the maximum persistence. It is to be noted that when copper is used as the sole activator in a zinc sulfide host that maximum persistence is attained within very narrow limits of activator, that is, about 0.011% of copper. Even slight deviations from the amount of the copper activator result in poorer quality phosphor. It is believed apparent that since wider ranges of the components used as activators in the present invention can be utilized and still obtain good quality compositions, more flexibility than heretofore has been possible in the art can be achieved.

The amount of manganese that is used as a component of the activator is from about 0.003% to about 0.11% by weight of the zinc sulfide host. Amounts of manganese from about 0.016% to about 0.08% by weight are preferred to achieve the best balance between persistence, intensity and color of emission.

The amount of zinc that is used as the third component of the activators is from about 0.66% to about 2.6% by weight of the zinc sulfide host. Amounts of zinc of from about 1.1% to about 1.6% by weight are preferred.

The compositions of this invention are insoluble in water and can, therefore, be dispersed in most water-based solutions. The phosphors of this invention can also be dispersed in clear organic solution used for coatings and paints or varnishes, shellacs or glazes. The phosphors can also be incorporated into plastics such as Lucite, polystyrene, polyvinyl chloride and the like. The amount of phosphor used will depend to a large degree upon the use. For example, from about 4% to about 20% by weight has been effective when used in plastics. In shellacs, glazes and the like, generally about 2 parts by weight of the composition of this invention to about 1 part of the vehicle yields extremely good coatings.

The emission spectra of the phosphors of this invention have been found to peak at about 525 nm. and have a band width (50% of the relative energy) of about 70 nm. The phosphors generally are screened and an average particle size of about 20 microns, as measured by the Fisher Sub-Sieve Sizer, is achieved. The bulk density of the phosphors having the foregoing particle size is about 23.6 grams/cc.

In addition to the activators, small amounts of fluxes such as, for example, as one or more alkali metal salts can be included in the mixture. The heat treatment is carried out in a non-oxidizing and preferably inert or slightly reducing atmosphere and may be advantageously conducted in a retort or muffle externally heated to import a temperature of 1000–1300° C. to the mixture. At the lower end of this muffling temperature range, a relatively long treating period is required and conversely at the upper end of the temperature range the heating period must be relatively short and must be carried out with care to prevent damage to the phosphor. In general, muffling temperatures within the range of 1200–1300° C. give particularly effective results. The heat treatment is continued for 1 to 3 hours, which is generally efficient to effect the necessary diffusion of the activator throughout the host and the resulting mixture is allowed to cool under non-oxidizing conditions and is then carefully ground. The grinding should be relatively gentle in order to avoid destroying the phosphorescence by crushing. The inclusion of fluxes in the mixture before the heat treatment is helpful as introducing the activators into the crystal during heat treatment. Various fluxes can be used without materially altering the improvement obtainable from the activators in these phosphors. Among suitable fluxes for this purpose are alkali metal salts such as, for example, sodium chloride, sodium carbonate, lithium sulfate. Moreover, any flux combination which is suitable for copper activated phosphors is suitable for the copper manganese zinc activated phosphors. Useful flux combinations are manganese chloride, barium chloride, sodium chloride. In large scale operations, the flux combination is of great importance because of its effect on the hardness of the sintered material aggregate and the recovery of useful phosphor. The amount of single flux and flux combination included in the mixture is relatively small, being generally about 1 to 4% by weight based on the weight of the mixture.

To more fully illustrate the photoluminescent phosphor composition of the present invention, the following detailed example is presented. All parts, proportions and percentages are by weight unless otherwise indicated.

Example I

About 3000 parts of zinc sulfide is charged into a ribbon mixer. About 90 parts of sodium chloride, about 0.9 part of copper sulfate, about 3 parts of manganese carbonate and about 56 parts of zinc oxide are added to the zinc sulfide. The materials are blended for about 15 minutes to achieve a relatively uniform mixture. The mixture is heated to about 1100° C. in a non-oxidizing atmosphere for about 3 hours. Large particles of the material are broken up by pulverizing and the material is then screened to obtain particles having an average size of about 20 microns, as measured by the Fisher Sub-Sieve Sizer. Samples of the material are tested for persistence and compared with a copper-activated zinc sulfide as a standard. Comparative results are given below wherein Sample A is the standard and Sample B is the composition of this invention.

TABLE I

| Time after excitation (minutes): | Relative photomultiplier output | |
| --- | --- | --- |
| | A | B |
| 0 | 100 | 100 |
| 0.2 | | 100 |
| 1.0 | 19 | 30 |
| 10 | 0.7 | 1.7 |
| 20 | .4 | .5 |
| 30 | .25 | .3 |

It is apparent that the persistence is dramatically improved over the complete range tested. Using a Jarrell-Ash spectroadiometer the ICI color coordinates are measured as $x=0.341$ and $y=0.575$. The emission spectra as measured by a Perkin Elmer radiometer indicates a peak at about 525 nm. with a band-width at 50% relative energy of about 70 nm.

While there has been shown and described what is at present considered to be the preferred embodiments of the invention, it will be obvious to those skilled in the art that various changes and modifications may be made therein without departing from the scope of the invention as defined by the appended claims.

I claim:
1. A photoluminescent phosphor composition that emits yellow light consisting essentially of zinc sulfide and from about 0.001% to about 0.05% by weight of copper, from about 0.003% to about 0.11% by weight of manganese and from about 0.66% to about 2.6% by weight of zinc, said percentages being based upon the the total weight of zinc sulfide.
2. A composition according to claim 1 wherein said copper is in an amount of from about 0.009% to about 0.03% by weight, said manganese is in an amount of from about 0.016% to about 0.08% by weight and said zinc is in an amount of from about 1.1% to about 1.6% by weight.
3. A composition according to claim 2 wherein said composition has an emission spectra that peaks at about 525 nm. when subjected to photoactivation.
4. A composition according to claim 3 wherein said composition has an emission having ICI color coordinates of $x=0.341$ and $y=0.575$ when subjected to photoactivation.

References Cited
UNITED STATES PATENTS

| 2,136,871 | 11/1938 | Wakenhut | 252—301.6 |
| 2,504,674 | 4/1950 | Fonda | 252—301.6X |
| 2,937,150 | 5/1960 | Lehman | 252—301.6 |

TOBIAS E. LEVOW, Primary Examiner

J. COOPER, Assistant Examiner